Patented Aug. 25, 1931

1,820,690

UNITED STATES PATENT OFFICE

ARTHUR L. BROWN, OF WILKINSBURG, PENNSYLVANIA, ASSIGNOR TO WESTINGHOUSE ELECTRIC AND MANUFACTURING COMPANY, A CORPORATION OF PENNSYLVANIA

FLUID CONDENSATION PRODUCT

No Drawing.   Application filed March 30, 1921.   Serial No. 457,128.

This invention relates to condensation products, more particularly to a phenolic condensation product having improved characteristics.

Heretofore, in the manufacture of phenolic condensation products, it was customary to cause the ingredients, usually including phenol, formaldehyde or its equivalent, and a catalyst to react and form a fusible solid which was purified in several ways, including the elimination of water. The solidified condensation product was then dissolved in a suitable solvent, usually a mixture of benzol and alcohol. The solution contained about 50% solvent and 50% condensation product in order to render the viscosity of the material low enough to allow the material to easily penetrate and impregnate fibrous sheet or other material for various uses.

It is desirable, for a number of reasons, to avoid the use of all or most of the solvent since, in the manufacture of materials in which a condensation product is incorporated, it is necessary to eliminate all the solvent from the final product. For instance, in forming plates of duck and a phenolic condensation product, it is necessary first to dissolve the condensation product in a suitable solvent, impregnate the duck with the solution and then heat to drive off the solvent, a large proportion of which is lost in the process.

The present invention is designed to provide an improved condensation product of the phenolic type, it being among the objects thereof to provide a condensation product which is fluid, has a low viscosity and which may be used for the impregnation of sheet material without the use of solvents.

In my copending application, Serial No. 412,564, for flexible composite articles and method of forming the same, filed September 24, 1920, and assigned to the Westinghouse Electric & Manufacturing Company, which has matured into Patent No. 1,633,976, I have described a new phenolic condensation product which is flexible and which, when incorporated with fibrous sheet material, such as paper or duck, produces a structure which has great strength and flexibility.

My present invention is particularly adapted to the composition described in said application but it is not limited to the particular material there described, being applicable to condensation products in general.

In accordance with my prior invention, I form a mixture of China wood oil, cresol and a drier, such as "tox tungate" solid, with formaldehyde in suitable proportions, as described in my application referred to above and heat the same in a suitable vessel for about 80 to 100 minutes at about 100-110° C. Warm water is then added to dissolve the excess formaldehyde from the partly condensed liquid and the solution is then decanted. The condensation product is then heated to about 120° C. and held at this temperature for a sufficient length of time so that, upon cooling to ordinary temperatures, a clear, viscous, mass results.

My copending application describes producing a flexible article as follows:

Forty parts by weight of cresol and one part by weight of "tox-tungate solid", (a commercial lead-manganese resinate and tungate, solid drier) are heated together to about 115° C. until the drier is in solution. Ten parts by weight of China wood oil are then added, stirred thoroughly, then thirty parts by weight of a 40% formaldehyde solution are added, and these materials are then raised to 100-110° C. in a suitably covered kettle, provided with some form of condenser to prevent loss of formaldehyde during the heating process.

The temperature is maintained at 100-110° C. until the wood oil has combined with the phenolic condensation product being formed, which time is determined by the fact that when the reaction is complete, none of the wood oil will be seen floating on the surface of the mixture. The compound then consists of two layers, the thick, viscous condensation product on the bottom of the kettle and the weakened formaldehyde solution on top. This reaction ordinarily takes place in about one hour to one hour and a half, dependent on the amount of the ingredients used.

Hot water is then added to the formaldehyde layer, the compound stirred thoroughly, allowed to settle, and the weakened formaldehyde is siphoned off or decanted. The small amount of formaldehyde solution remaining is then boiled out, care being taken not to raise the temperature above 130° C.

In practising the present invention, I utilize the product obtained by treatment of the materials with formaldehyde as above stated and after as much as possible of the excess formaldehyde and water solution has been decanted from the product, and treat the same in a special manner. The product at this point is a rather thin emulsified liquid containing water which is held by the other materials. It is placed in a vacuum distillation apparatus and the excess formaldehyde and water distilled off at a temperature of about 50 to 80° C. The product resulting from this treatment is a clear, homogeneous fluid having a low viscosity, which is approximately that of the ordinary solution of phenolic condensation product in an equal amount of solvent.

This product possesses the property of imparting flexibility and cold punching qualities to plates of fibrous material impregnated with the same. The product may be applied to paper or fabric by any suitable method, such as dipping or squeezer-roll, without the use of any solvent, since it possesses sufficient fluidity in itself to be so applied. The said material impregnated with the fluid condensation product is then subjected to sufficient heat to cause a reaction to take place whereby the liquid product is caused to become very viscous or semi-solid but still soluble and fusible. The sheet material thus impregnated may then be treated as is common in the art to render the condensation product infusible and insoluble.

My new condensation product may be utilized in a somewhat different manner to form plates. Paper or fabric is cut to the size of plate desired and a sufficient number of layers assembled, clamped together, and dipped into a vessel containing the fluid condensation product. The clamped plate, after immersion in the condensation product, is removed from the vessel, the excess liquid removed and the plate dried at about 90° C. for a suitable length of time, about one hour. The plate is then consolidated and the condensation product rendered infusible and insoluble by molding under pressure with the application of heat.

In the example given, I have described a condensation product containing 20% of China wood oil, but it is obvious that the proportions may be varied in accordance with the strength and flexibility desired in the finished product, and I generally form products having an oil content of 15 to 25%, although, obviously, wider variations of oil content are feasible.

The advantages of my new material are apparent. It eliminates expensive solvent, which not only adds to the initial cost of the condensation product but increases the apparatus and labor necessary to utilize the same. By providing a solventless material, I eliminate expensive heating and drying towers.

Although I have described a specific example of the practise of my invention, it is apparent that various modifications may be made within the scope thereof. For instance, instead of utilizing vacuum distillation to eliminate water and excess formaldehyde, I may treat the emulsified liquid condensation product with a solvent, such as a mixture of benzol and alcohol, to break up the emulsion. The water and formaldehyde solution is then decanted and the solvent is distilled from the condensation product. These and other changes may be made in the practise of my invention within the scope of the claims appended hereto.

I claim as my invention:

1. A method of forming a liquid condensation product which comprises causing a phenolic substance, China wood oil and formaldehyde to react to form a fluid product and removing water therefrom by vacuum distillation at about 50 to 80° C.

2. The process of preparing a liquid condensation product of cresol, a substance containing an active methylene group, a drier and China wood oil which comprises combining said ingredients at a temperature of about 100° C., removing excess water and water soluble ingredients therefrom and then heating under vacuum at 50° to 80° C. for sufficient time to remove uncombined formaldehyde and residual water that may remain.

3. The process of preparing a liquid condensation product of cresol, formaldehyde, a drier and a polymerizable vegetable oil which comprises combining said ingredients at a temperature of about 100° C., removing excess water and water soluble ingredients therefrom and then heating under vacuum at 50° to 80° C. for sufficient time to remove uncombined formaldehyde and residual water that may remain.

4. The process of preparing a liquid condensation product of cresol, formaldehyde, a drier and China wood oil which comprises combining said ingredients at a temperature of about 100° C., removing excess water and water soluble ingredients therefrom and then heating under vacuum at 50° to 80° C. for sufficient time to remove uncombined formaldehyde and residual water that may remain.

5. A condensation product formed from a mixture comprising about 49% of cresol, a substantial proportion of a vegetable drying oil less than the proportion of said cresol, a drier capable of catalyzing the reaction in the proportion of about 2.5% of said cresol and a substance containing an active methylene group, said product being liquid and capable of hardening when heated.

6. A condensation product formed from a mixture comprising about 49% of cresol, a substantial proportion of China wood oil less than the proportion of said cresol, a drier capable of catalyzing the reaction in the proportion of about 2.5% of said cresol and a substance containing an active methylene group, said product being liquid and capable of hardening when heated.

7. A condensation product formed from a mixture comprising about 49% of cresol, a substantial proportion of a vegetable drying oil less than the proportion of said cresol, a drier capable of catalyzing the reaction in the proportion of about 2.5% of said cresol and a substance containing an active methylene group, said drier being an esterified material including the acid radical of a drying oil and one or more metals, said product being liquid and capable of hardening when heated.

8. A condensation product formed from a mixture comprising about 49% of cresol, a substantial proportion of China wood oil less than the proportion of said cresol, a drier capable of catalyzing the reaction in the proportion of about 2.5% of said cresol and a substance containing an active methylene group, said drier being esterified material including the acid radical of a drying oil and one or more metals of a group of metals consisting of lead and manganese, said product being liquid and capable of hardening when heated.

9. A condensation product of a combined phenolic body, China wood oil, "tox-tungate" drier and a substance containing an active methylene group which is substantially free from water and uncombined formaldehyde, said product being fluid at ordinary temperatures and being capable of hardening when subjected to heat to provide a material which is flexible and substantially insoluble and infusible.

10. A condensation product formed from a mixture comprising a phenolic body, a vegetable drying oil and a substance containing an active methylene group, the proportion of the phenolic body to the vegetable drying oil being in the ratio of about four to one, said product being liquid at ordinary temperatures and capable of hardening when heated.

11. A condensation product formed from a mixture comprising cresol, China wood oil and a substance containing an active methylene group, the proportion of cresol to China wood oil being in the ratio of about four to one, said product being liquid at ordinary temperatures and capable of hardening when heated.

12. The process of preparing a liquid condensation product comprising cresol, China wood oil and formaldehyde which comprises combining said ingredients, removing excess water and water-soluble ingredients therefrom and then heating under vacuum at 50° to 80° C. to remove uncombined formaldehyde and any residual water that may remain, the proportion of said combining ingredients being such that the finally treated condensation product is liquid at ordinary temperature.

13. The process of preparing a liquid condensation product which comprises mixing cresol, China wood oil and formaldehyde and causing them to react at a temperature of from 100 to 110° C., removing excess water and water-soluble ingredients therefrom and then heating under vacuum at 50° to 80° C. to remove uncombined formaldehyde and any residual water that may be present, the proportion of said reacting ingredients being such that the finally treated condensation product is liquid at ordinary temperatures.

14. The process of preparing a liquid condensation product capable of being rendered insoluble and infusible which comprises mixing cresol, China wood oil and formaldehyde and causing them to react at a temperature of from 100° to 110° C., removing excess water and water-soluble ingredients therefrom, and then heating under vacuum at 50° to 80° C. to remove uncombined formaldehyde and any residual water that may be present, the proportion of said reacting ingredients being such that the finally treated condensation product is liquid at ordinary temperatures.

15. A condensation product formed from a mixture comprising a phenolic body, a vegetable drying oil and a substance containing an active methylene group, the proportion of the phenolic body being substantially in excess of the vegetable drying oil, said product being liquid at ordinary temperatures and capable of hardening when heated.

16. A condensation product formed from a mixture comprising a major proportion of cresol, from 15 to 25% of a vegetable drying oil and a substance containing an active methylene group, said product being liquid at ordinary temperatures and capable of being hardened when heated.

17. A condensation product formed from a mixture comprising a major proportion of cresol, from 15 to 25% of China wood oil and formaldehyde, said product being liquid at ordinary temperatures and capable of being hardened when heated.

In testimony whereof, I have hereunto subscribed my name this 25th day of March, 1921.

ARTHUR L. BROWN.